United States Patent
Abe et al.

[11] Patent Number: 6,073,938
[45] Date of Patent: Jun. 13, 2000

[54] SEALING STRUCTURE

[75] Inventors: Yoshitaka Abe; Hironobu Imanaka, both of Toyonaka; Yukio Yoshida, Suita; Yoshinori Iwamoto; Takashi Suzuki, both of Toyonaka, all of Japan

[73] Assignee: Kokusan Parts Industry Co., Ltd., Osaka, Japan

[21] Appl. No.: 08/965,155

[22] Filed: Nov. 6, 1997

[51] Int. Cl.⁷ .................................................. F16J 15/08
[52] U.S. Cl. ............................................. 277/654; 277/644
[58] Field of Search .................... 74/606 R, 590, 74/591, 592, 593, 596, 628, 644, 650, 654; 428/66.4

[56] References Cited

U.S. PATENT DOCUMENTS

| | | | |
|---|---|---|---|
| 3,737,169 | 6/1973 | Glynn | 277/596 |
| 3,930,656 | 1/1976 | Jelinek | 277/596 X |
| 4,625,979 | 12/1986 | Inciong | 277/596 |
| 4,828,275 | 5/1989 | Udagawa | 277/596 |
| 5,172,919 | 12/1992 | Takasaki et al. | 277/644 |
| 5,322,299 | 6/1994 | Terai | 277/596 |
| 5,390,939 | 2/1995 | Terauchi et al. | 277/650 |
| 5,490,681 | 2/1996 | Plunkett et al. | 277/592 |
| 5,582,415 | 12/1996 | Yoshida et al. | 277/592 |
| 5,730,446 | 3/1998 | Taylor et al. | 277/644 X |

OTHER PUBLICATIONS

Japanese Industrial Standard, Hardness Testing Methods for Vulcanized Rubber (JIS K 6253–1993) translated by Japanese Standards Association, Apr. 1997.

Primary Examiner—Terry Lee Melius
Assistant Examiner—Greg Binda
Attorney, Agent, or Firm—Armstrong, Westerman, Hattori, McLeland & Naughton

[57] ABSTRACT

A sealing structure for sealing a valve body from a separating plate in a liquid-tight fashion. A first sealing layer is printed on the mating surface of the separate plate and a second sealing layer is printed along the first sealing layer with at least a part of the second sealing layer overlapping the first sealing layer and the printing height of the second sealing layer being made larger than that of the first sealing layer whereby the valve body and the separate plate are sealed liquid-tight from each other by a sealing portion comprising the first and second sealing layers. The sealing portion provided by the sealing structure of the present invention has the advantages that it hardly comes off, has an excellent sealing property and is capable of reducing the width thereof to meet a design change.

6 Claims, 15 Drawing Sheets

Fig. 13
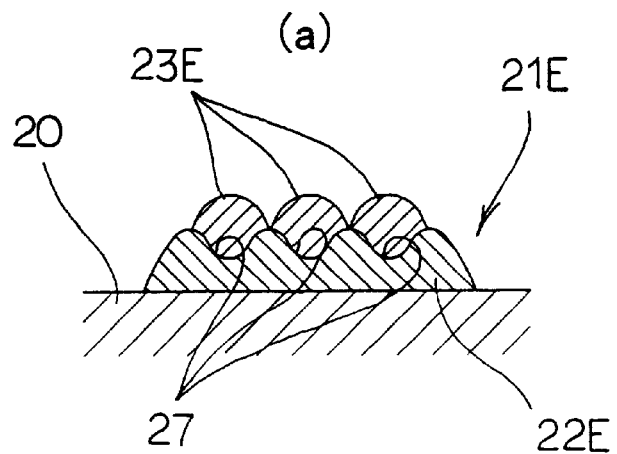
(a)
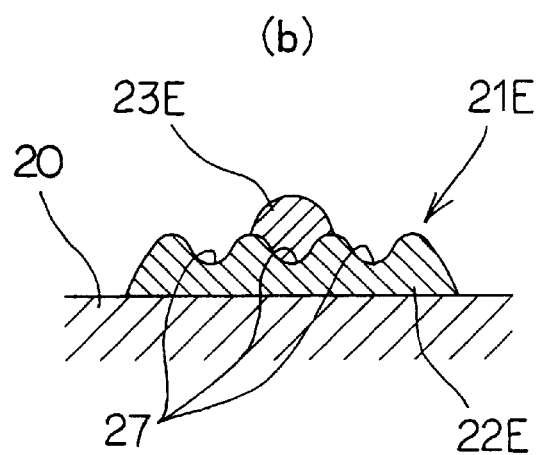
(b)
Fig. 14
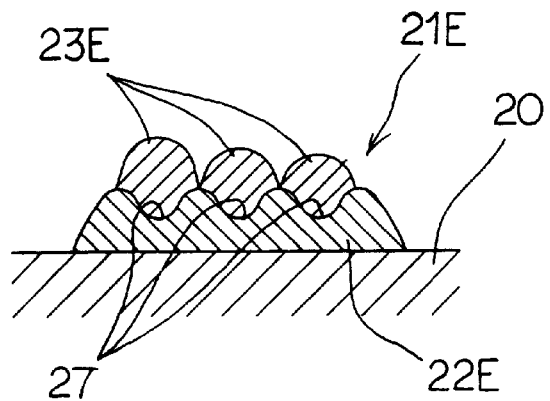

Fig. 15
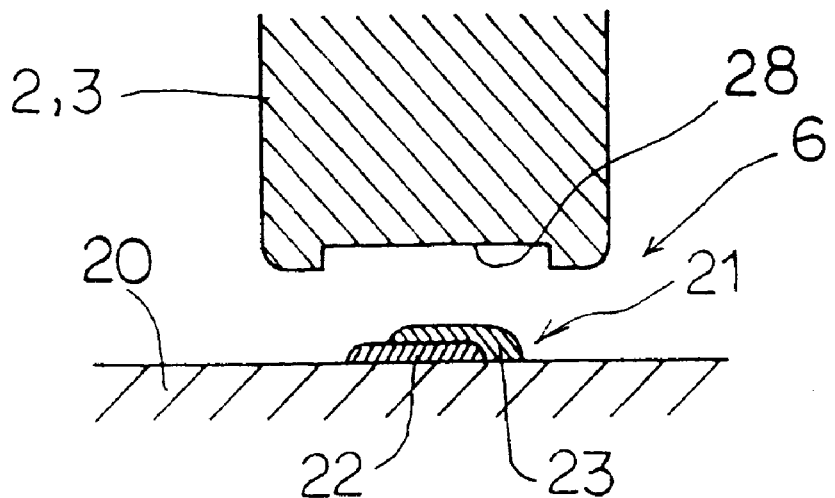
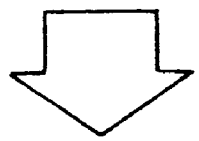
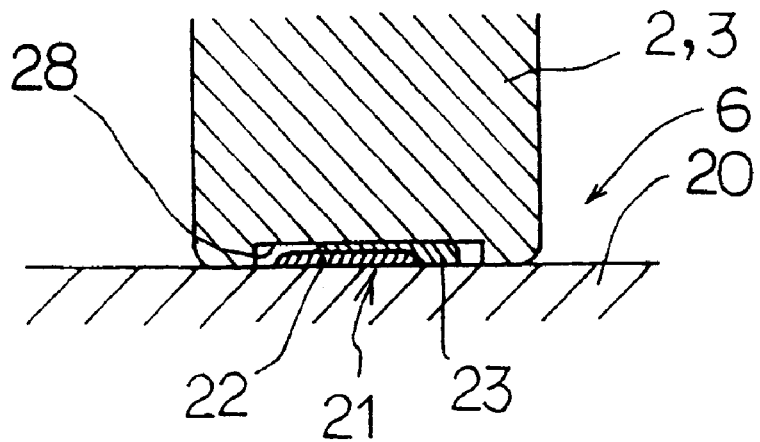

Fig. 16
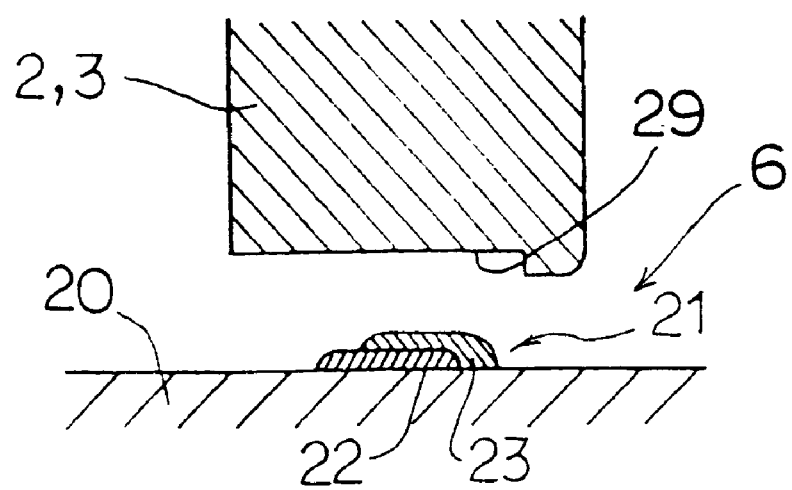
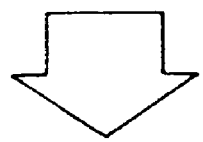
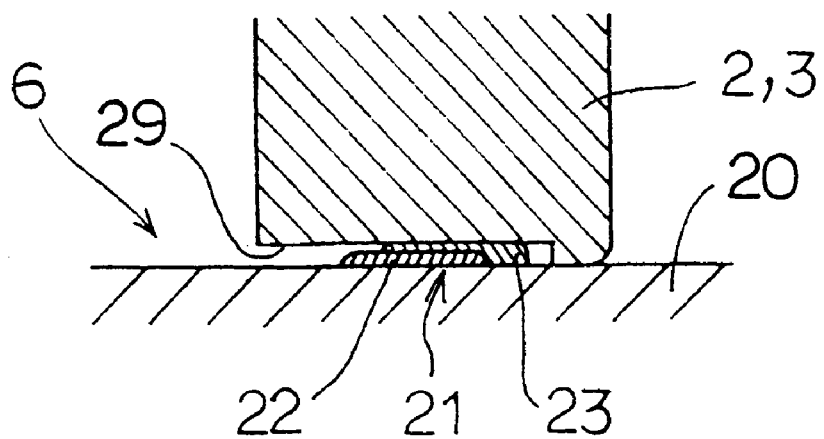

Fig. 2 2
(a)
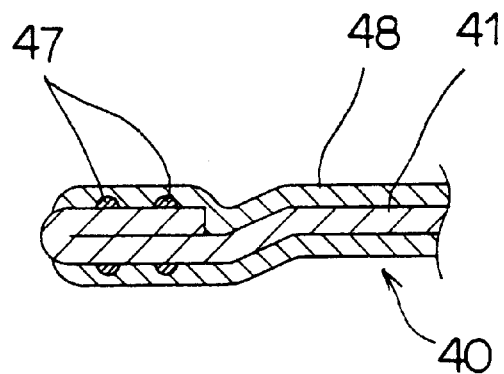
(b)
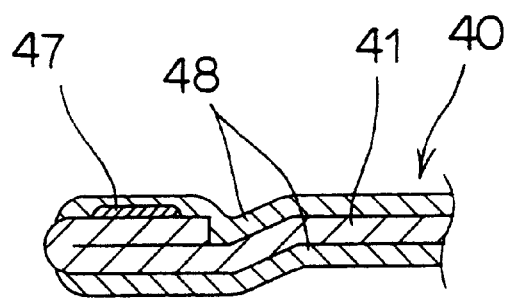
(c)
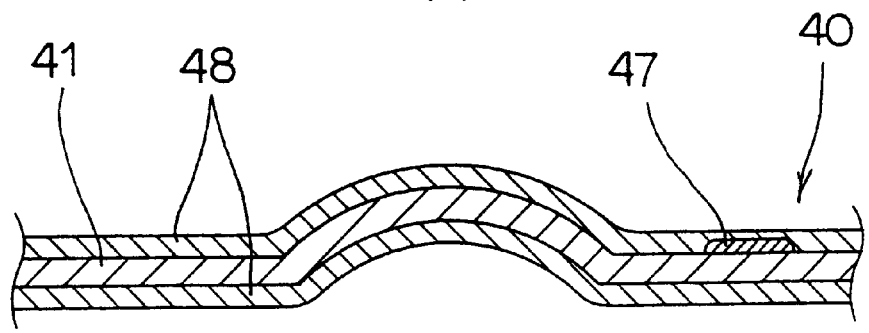

SEALING STRUCTURE

BACKGROUND OF THE INVENTION

1. Field of the Invention

The present invention relates to a sealing structure for sealing two members in a liquid-tight or air-tight fashion by using two kinds of sealing layers having different characteristics.

2. Description of Prior Art

Generally, as means for sealing two members from each other in a liquid-tight or air-tight fashion by inserting a synthetic resin, metal or paper gasket between them is widely employed.

However, where this kind of sealing structure is applied, for example, to the control valve unit of the automatic gear of an automobile, the use of a plurality of gaskets has been necessitated resulting in lowering the fabricability of the valve unit Further, there has arisen the problem that it is necessary to form a number of through holes in the gaskets in correspondence to oil paths which not only increases the manufacturing cost of the gaskets but also makes it unable to meet any possible design change or the like with ease.

In order to solve the above-described problem, there has been proposed a sealing structure which is economical and which has an excellent fabricability wherein a synthetic resin material or the like is printed on the mating surface of one of two members to be sealed so that a sealing portion is integrally formed on that member.

However, even in the case of the above-mentioned sealing structure, when a sealing portion made of a soft material is formed on the mating surface of one of two members to increase the sealing property, the sealing portion is abnormally deformed by bolt fastening so that both edges of the sealing portion come off from the mating surface while on the contrary, when a sealing portion made of a hard material is formed on that surface, the sealing property of the sealing portion lowers.

Accordingly, in Japanese Unexamined Patent Publication No.S62-249786, there is proposed a sealing structure in which a first sealing portion showing a comparatively non-compressibility is formed by printing on the mating surface of one of two members and a second sealing portion showing an elastic compressibility is formed by printing at a position near the first sealing portion in spaced apart and parallel relationship with the first sealing portion.

According to the sealing structure disclosed in the above-mentioned Japanese Unexamined patent Publication, the first sealing portion showing comparatively non-compressibility functions as a stopper for securing a gap between the two members so that the deformation of the second sealing portion showing elastic compressibility is controlled to thereby prevent the coming off of the second sealing portion due to its abnormal deformation. However, since the first and second sealing portions are arranged in parallel and spaced-apart relationship with each other, the problem have arisen that the width of the entire sealing portion becomes large so that it can not be applied to a unit having mating surfaces of small width such as a control valve.

Further, the above-mentioned sealing structure involves the problem that since the first and second sealing portions are bonded to the two members of different compositions, the use of materials for the first and second sealing portions is much restricted because of the necessity of securing the bonding power of the both members to a sufficient degree.

SUMMARY OF THE INVENTION

Accordingly, an object of the present invention is to provide a sealing structure which hardly comes off, has an excellent sealing property and is capable of reducing the width of its sealing portion as much as possible.

The sealing structure according to the present invention is for sealing two members from each other in a liquid-tight or air-tight fashion such that a first sealing layer is formed by printing on at least one of mating surfaces of the two members and a second sealing layer made of a material softer than the material of which the first sealing layer is made is printed along the first sealing layer with at least a part of the second sealing layer overlapping the first sealing layer and the height of the printed second layer being made larger than that of the printed first sealing layer.

In the above structure, the second sealing layer may be so formed as to cover the entire outer surface of the first sealing layer. Further, the first sealing layer may be provided with a groove or a plurality of grooves at the intermediate portion in the direction of width thereof and the second sealing layer may be formed to fill up the groove or at least one of the plurality of grooves. Still further, at least the width or the height of the first or second sealing layer may be adjusted so that the surface pressure of the sealing portion comprised of the two sealing layers with respect to the remaining mating surface becomes a desired value. Further, as regards the hardness of the sealing portion, the hardness of the first sealing layer may be set to a value of 100 or more and that of the second sealing layer may be set to a value less than 100 in accordance with the A type durometer hardness stipulated by JISK6253. In addition, a sealing portion may be formed on one of the mating surfaces of the two members while a sealing groove closely fitted on the mating surface of the other member at a position corresponding to the sealing portion. Moreover, one of the two members may be a separate plate of a control valve unit of an automatic gear while the other member may be a valve body partitioned by the separate plate in an oil-tight fashion.

To describe the operation of the sealing structure according to the present invention, the sealing portion comprising the first and the second sealing layer is formed on at least one of the mating surfaces of the two members so that when the two members are joined together, the mating surfaces of both members are sealed from each other through the sealing portion.

The second sealing layer is made of a material softer than the material of which the first sealing layer is made and the height thereof is made larger than that of the first sealing layer so that in the combined state of the two members, the second sealing layer adheres to the mating surface of the other member to thereby seal both of the members from each other with the first sealing layer serving as a stopper for the second sealing layer and providing a gap between the two members thereby preventing the second sealing layer from becoming abnormally deformed. In addition, even when the edge of the second sealing layer is arranged near the top of the first sealing layer, since the first sealing layer also deforms to some degree, the edge of the second sealing layer is prevented from becoming abnormally deformed.

Furthermore, since the first sealing layer is formed along the second sealing layer, the entire width of the sealing portion can be reduced while sufficiently securing the width of the second sealing layer substantially performing a sealing function and it is possible to form with ease a sealing portion even on a small width portion of the mating surface. In addition, the first and second sealing layers are formed by printing so that even a sealing layer of complicated pattern can be formed. Moreover, both of the sealing layers are made of similar materials having a high degree of bonding strength so that when compared to a case where both of the sealing layers are separately provided, the sealing portion formed by a combination of the two layers has the advantage of being able to improve its bonding strength with respect to the mating surface by increasing the bonding area with respect to the mating surface while reducing the width of the sealing portion.

BRIEF DESCRIPTION OF THE DRAWINGS

FIG. 13(a) is a cross sectional view of a sealing portion of a sixth structure;

FIG. 13(b) is a cross sectional view of a sealing portion of a seventh structure;

FIG. 14 is a cross sectional view of a sealing portion of an eight structure;

FIG. 15 is a cross sectional view of a sealing portion of a ninth structure;

FIG. 16 is a cross sectional view of an essential sealing portion of a tenth structure;

FIG. 22 is a vertical sectional view of a sealing portion of a thirteenth structure;

PREFERRED EMBODIMENT OF THE INVENTION

The preferred embodiment of the present invention will now be described with reference to the accompanying drawings.

The embodiment is an application of the present invention to a sealing structure of a control valve unit for an automatic gear of an automobile.

Figure 1:
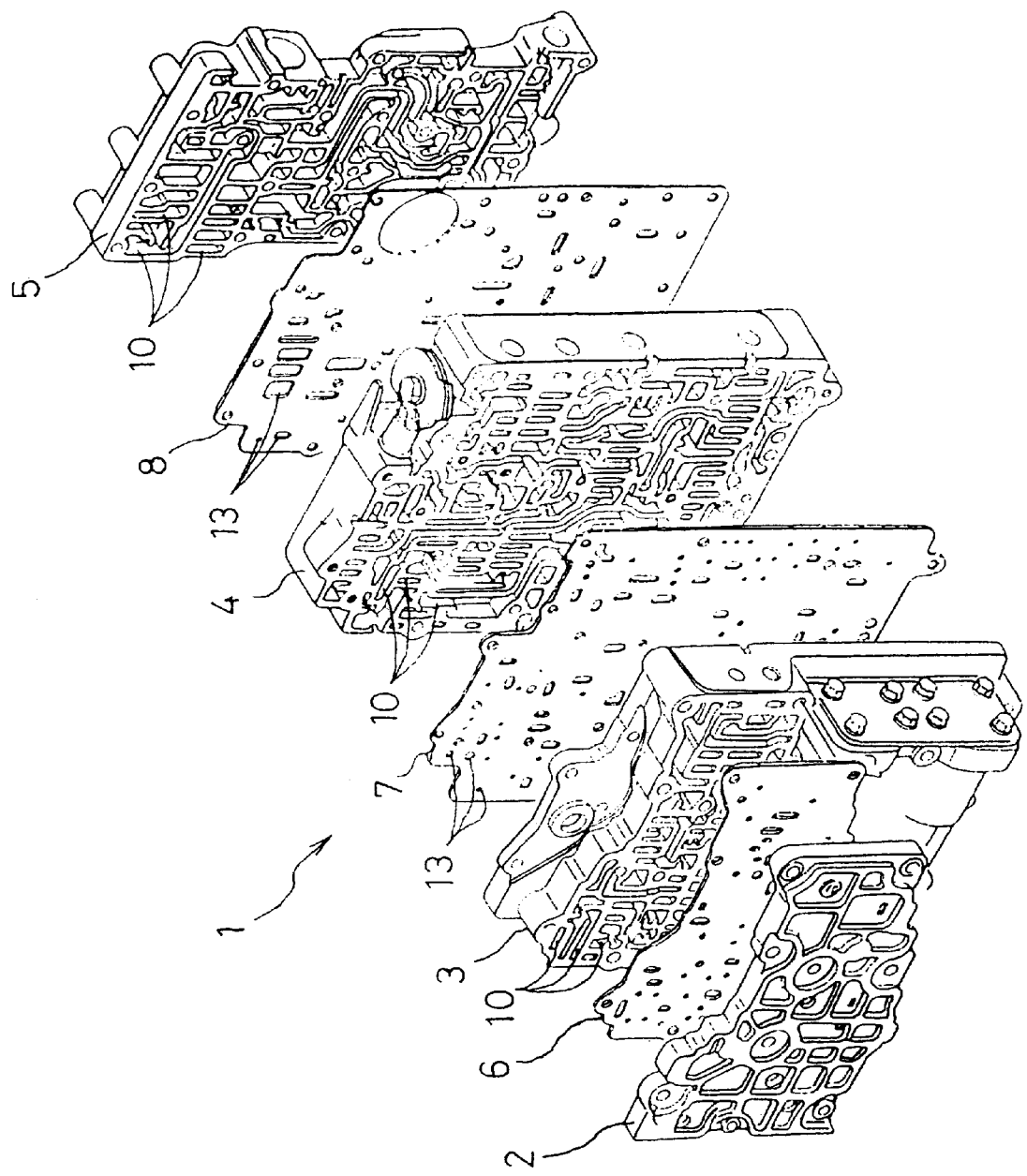
FIG. 1 is an exploded perspective view of a control valve unit of the present invention.

As shown in FIG. 1, a control valve unit 1 comprises a front valve body part 2, a pre-main valve body part 3, a main valve body part 4 and a rear valve body part 5. Between the valve body parts 2 and 3, between the valve body parts 3 and 4 and between the valve body parts 4 and 5, there are mounted separate plates 6, 7 and 8, respectively.

On one side surface of each of the valve body parts 2 and 3 and on both side surfaces of each of the valve body parts 3 and 4, there are formed oil grooves 10 and a channel 12 of predetermined patterns for receiving check balls 11 (see FIG. 2) and between the mating surfaces of the valve body parts 2–5 there are attached the separating plates 6–8 in an oil-tight fashion so that hydraulic circuits are established between the separating plates 6–8 and the valve body parts 2–5, and further, a plurality of oil holes 13 for establishing communication among the oil grooves 10 of the adjoining valve body parts 2–5 are formed in accordance with a predetermined arrangement. It should be noted that a detailed description of the hydraulic circuits themselves of the above-mentioned control valve unit 1 is omitted since they have no direct relation with the present invention. Further, in FIG. 1, the description of a sealing section 21 (to be described later) is omitted.

Next, the seating structures for oil-tight sealing the valve body parts 2–5 and the separating plates 6–8 will be described by referring to FIGS. 2 through 7 but the sealing structures are basically the same and therefore, only the sealing structure for oil-tight sealing the front valve body part 2, the pre-main valve body 3 and the separating plate 6 will be described.

Figure 2A:
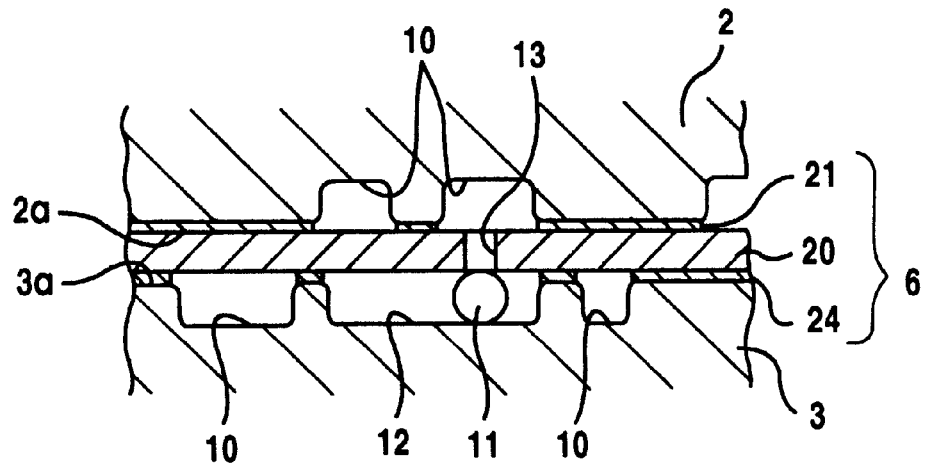
FIG. 2 is a cross sectional view of an essential portion of the control valve unit of the present invention.
Figure 2B:
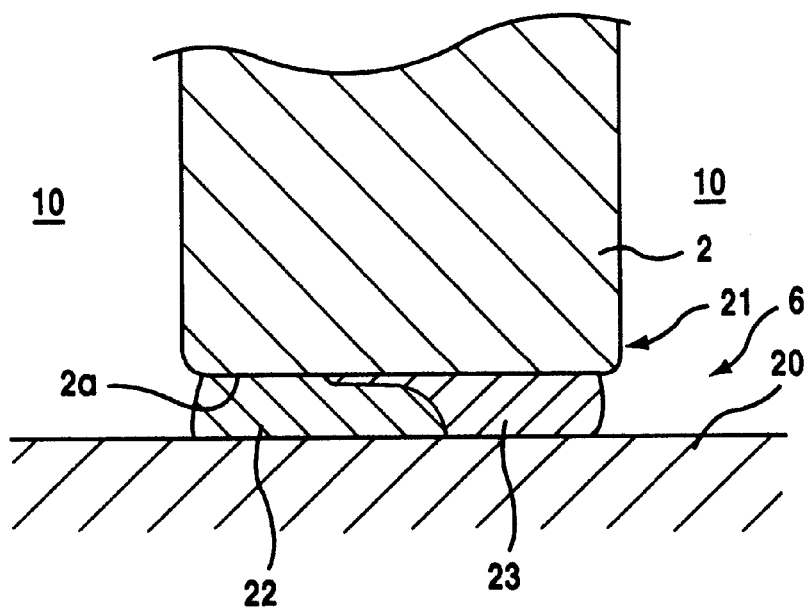
Figure 3A:
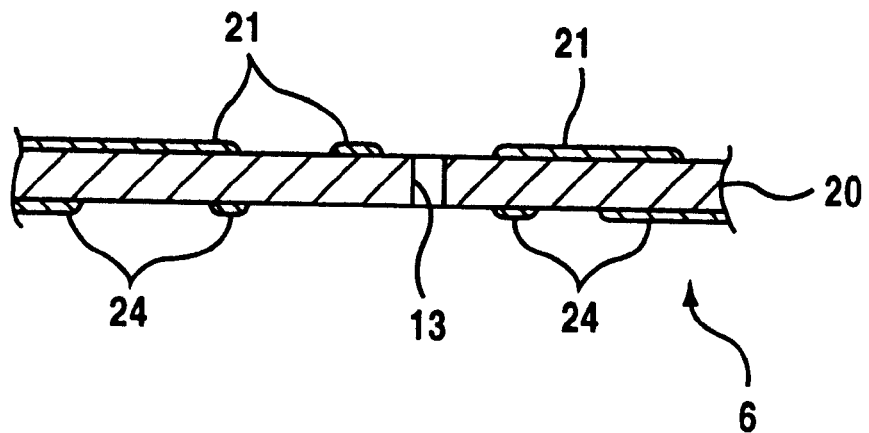
FIG. 3 is a cross sectional view of an essential portion of a separating plate of the control valve unit of the present invention.
Figure 3B:
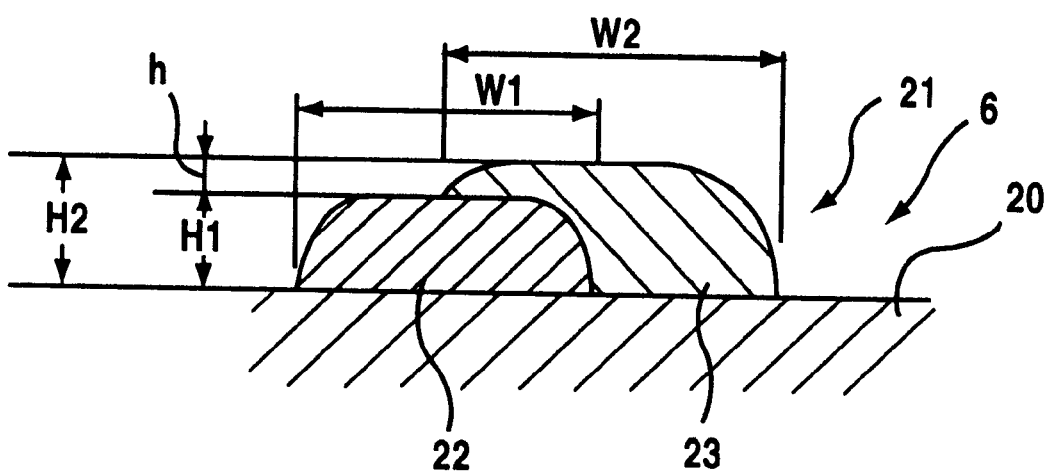
Figure 4:
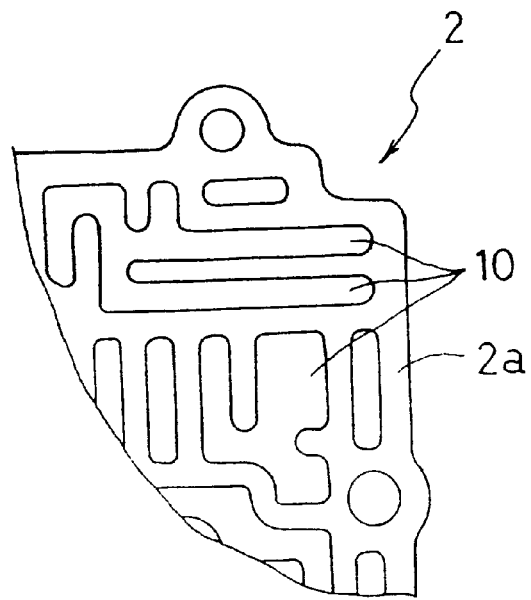
FIG. 4 is a view showing a separate plate side end face of an essential portion of a front valve body part of the control valve unit of the present invention.
Figure 5:
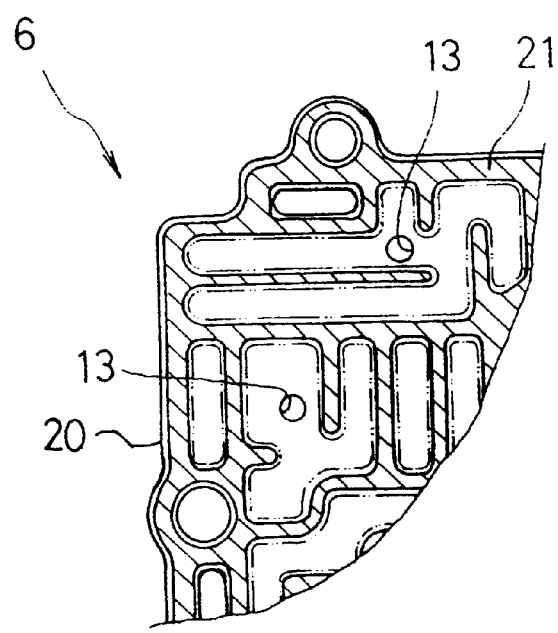
FIG. 5 is an illustration of a sealing portion of the separate plate to be formed on the surface adjacent to a pre-main valve body part of the control valve unit of the present invention.
Figure 6:
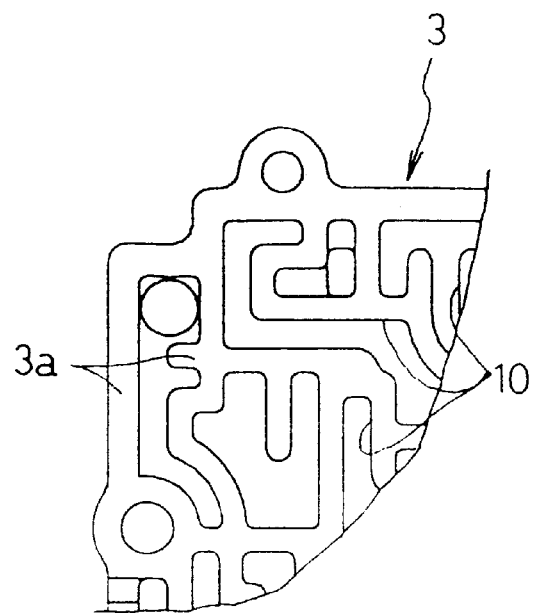
FIG. 6 is a view showing an end face of the separate plate adjacent to the pre-main valve body part of the control valve unit of the present invention.
Figure 7:
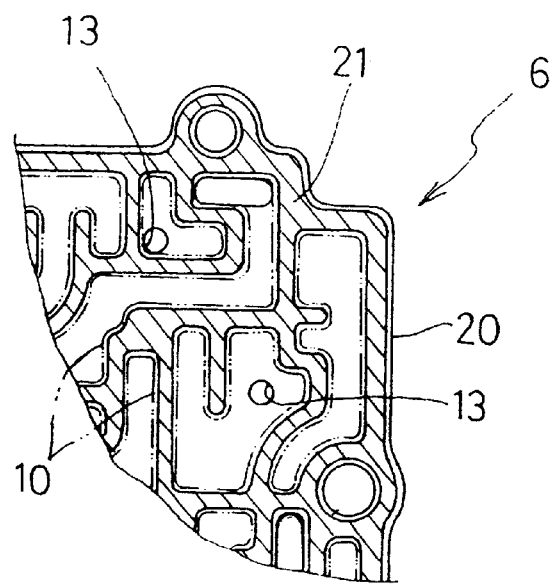
FIG. 7 is an illustration of a sealing portion of the separate plate to be formed on the surface adjacent to a main valve body part of the control valve unit of the present invention.

The separating plate 6 is provided with a planar base plate 20 and sealing portions 21 and 24 formed on both sides of the planar base plate 20. As shown in FIG. 2, the sealing portion 21 is formed even up to the inside of the valve body parts 2 and 3 corresponding to the mating surfaces 2a and 3a ( shown with virtual lines) of the valve bodies 2 and 3 as shown by hatching in FIGS. 5 and 7 lest the side edge of the sealing portion 21 should expose to the oil grooves 10 and a groove 12.

Figure 8:
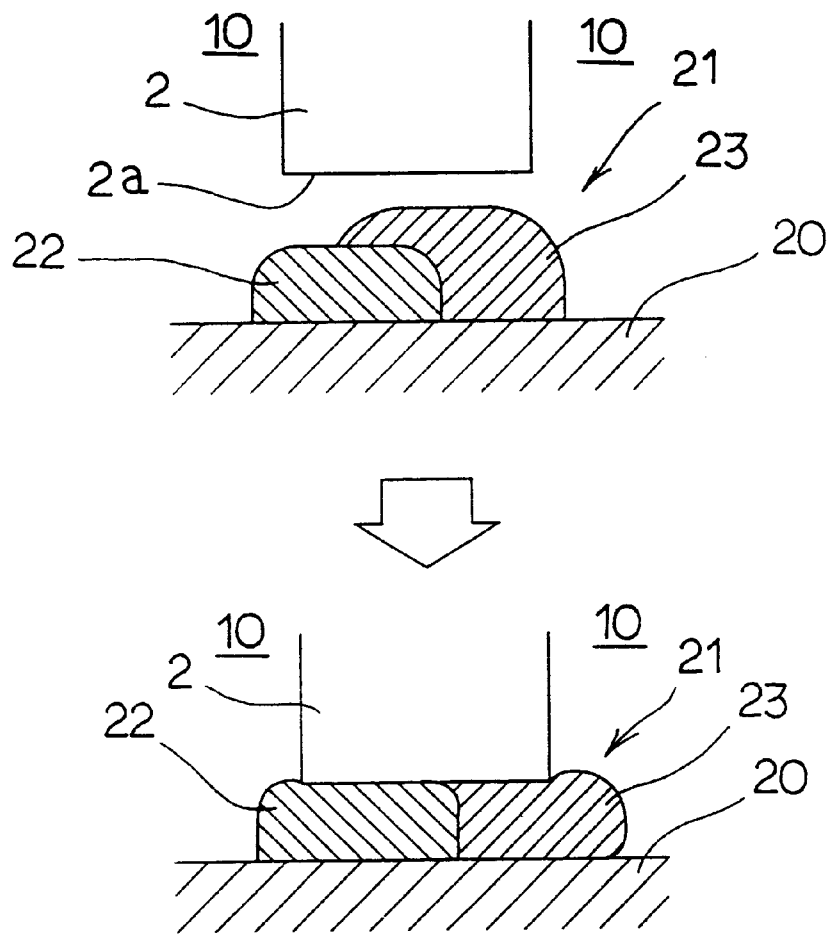
FIG. 8 is a cross sectional view of a portion near the sealing portion when the width of the sealing portion is enlarged.

However, the width of the sealing portion 21 can be freely set so that for example, it may be so formed as to become narrower toward a bolt clamping section. Further, as shown in FIG. 8, when the side edge of the sealing portion 21 is exposed to some degree toward the oil grooves 10 or the groove 12, the exposed portion extends round to the valve body 2 to increase the contact area between the sealing portion 21 and the valve body 2, so that the sealing performance can be further increased. As shown in FIG. 2(a), where the check ball 11 is loaded in the groove 12, the width of the sealing portion 21 is so set that the side edge of the sealing portion 21 does not come into contact with the check ball 11.

The sealing portion 21 comprises a first sealing layer 22 which is directly printed on the separating plate 6 and a second sealing layer 23 which is printed along the first sealing layer 22 while at least a part thereof is overlapped to the first sealing layer 22. The first and second sealing layers 22 and 23 are made of the same kind of materials, but the second sealing layer 23 is softer than the first sealing layer 22; such that, for example, according to the type A durometer hardness stipulated in JIS(Japanese Industrial Standards) K6253–1993, the hardness of the first sealing layer 22 is set to a value of 100 or more and the hardness of the second sealing layer 23 is set to a value of less than 100. It should be noted that more practically, the hardness of the first sealing layer 22 is preferably set to a value in the range of between 10 and 50 according to the Type D durometer hardness and the hardness of the second sealing layer 23 is preferably set to a value in the range between 20 and 50 according to the Type D durometer hardness because if it is less than 20, the second sealing layer 23 expands outward to become exposed to the oil grooves 10 or the side edges of the layer deforms much to come off easily while if it is larger than 50, the sealing property of the layer lowers.

Prior to assembling the separating plate 6 between the valve body parts 2 and 3, the height H2 of the printed second sealing layer 23 is set to a value higher than the height H1 of the printed first sealing layer 22 and it is preferable that for example, the height H2 be set to a value in the range of between 0.15–0.18mm and the height H1 be set to a value in the range of between 0.02 and 0.05mm.

In the case of such sealing portion 21, the heights H1 and H2 of the first and second sealing layers are partially set large or the difference between the two aim heights H1 and H2 is set large or the widths W1 and W2 of the two sealing layers are set small to adjust the surface pressure of the portion being so set to become higher than the remaining portion. Accordingly, it is possible to improve the entire sealing performance by adjusting the widths or thicknesses of the sealing layers 22 and 23 near the bolt clamping sections, for example.

For the above-mentioned base plate 20, it is possible to use a planar member made of a metallic material such as stainless steel or an aluminum alloy or a non-metallic material such as a synthetic resin material but in view of the fact that the base plate 20 is used in the hydraulic circuit requiring no rust preventive treatment, it is possible to make it by using a steel plate having sufficient strength and rigidity and capable of being manufactured at low cost.

After degreasing the base plate 20, the sealing layers 22 and 23 are printed on the surface of the base plate 20 and in this case, in order to improve the adhesion of the sealing layers 22 and 23 to the base plate 20, the surface of the base plate 20 may be subjected to a blast treatment or a chemical treatment to thereby make the surface irregular before degreasing. Further, in order to improve the adhesion of the sealing layers 22 and 23 with respect to the base plate 20, a primer may be coated on both surfaces of the base plate 20 before the sealing layers 22 and 23 are printed thereon.

As printing techniques for forming the sealing layers 22 and 23 on the base plate 20, printing techniques such as relief-printing, lithography, intaglio printing, screen printing, composing, magnetic ink printing, hot stamping or material coating techniques by a dispenser may be employed.

Further, as materials for the sealing layers 22 and 23, synthetic rubber materials such as fluoro-carbon rubber, NBR rubber, SBR rubber and silicon, synthetic resin materials such as furan resin, epoxy resin, silicon resin, phenol resin, urethane resin, polyimide resin, polyvinyl resin, acrylic resin, polyurethane resin, ABS resin and PTFE (tetrafluoroethylene), ultraviolet ray hardening synthetic resin materials and composite materials consisting of a mixture of any of the above-mentioned synthetic resin rubber materials or synthetic resin materials and any of a metallic powder of an aluminum alloy, copper, brass or stainless steel, a glass powder, glass fibers, a ceramic powder, ceramic fibers and a powder of molybdenum disulfide may be used.

Next, the operation of the above-described sealing structure will be described.

Like the separating plate 6, each of the separating plates 7 and 8 is provided with the sealing layers 22 and 23 and the control valve unit 1 is formed by assembling and fastening the four valve body parts 2 through 5 and the separating plates 6 through 8 by means of bolts (not shown). Thus, since the sealing layers 22 and 23 are integrally formed with each of the separating plates 6–8, the assembling operation of the control valve unit 1 is sharply simplified.

Further, since the sealing layers 22 and 23 are formed by printing process, they can be formed even to a very complicated pattern with ease. Therefore, it is possible to reduce the contact areas of the sealing layers 22 and 23 with the working oil as much as possible by assembling the control valve unit 1 without exposing the sealing layers 22 and 23 into the oil grooves 10 and the channel 12, to thereby prevent the deterioration of the sealing layers and to increase the contact areas of the sealing layers 22 and 23 with the valve body as large as possible by causing the sealing layers 22 and 23 to become exposed to some degree toward the oil grooves 10 and the channel 12, to thereby enhancing the sealing property of these layers.

Further, by placing the second sealing layer 23 over the first sealing layer 22, it is possible to secure sufficiently the sealing width of the second sealing layer 23 which greatly contributes to the sealing performance while reducing the width of the sealing portion 21 as much as possible. That is, it becomes possible to easily form the sealing portion 21 even at a narrow width portion of the mating surfaces while keeping the sealing performance to a sufficient degree. In addition, since the first sealing layer 22 made of a hard material functions as a stopper for securing the distance between the mating surfaces of the valve body parts 2–5 and the separating plates 6–8, the coming off of the second sealing layer 2 due to any abnormal deformation of that layer can be securely prevented. Moreover, since the first and the second sealing layers 22 and 23 are made of materials of the same kind, the bonding strength of both the layers can be easily enhanced so that by increasing the contact area of the mating surfaces while reducing the width of the sealing portion 21, the bonding strength of the mating surfaces can be enhanced when compared to a case where the sealing layers 22 and 23 are formed independently of each other.

Further, the formation of the sealing layers 22 and 23 of different patterns on the surface of the base plate 20 by a simple operation of exchanging the original printing plate can be made possible so that the sealing structure can meet a change in the design of the control valve unit 1.

Next, another embodiment of the present invention in which the sealing portion 21 and the sealing structure of the first embodiment are partially modified will be described.

Figure 9:
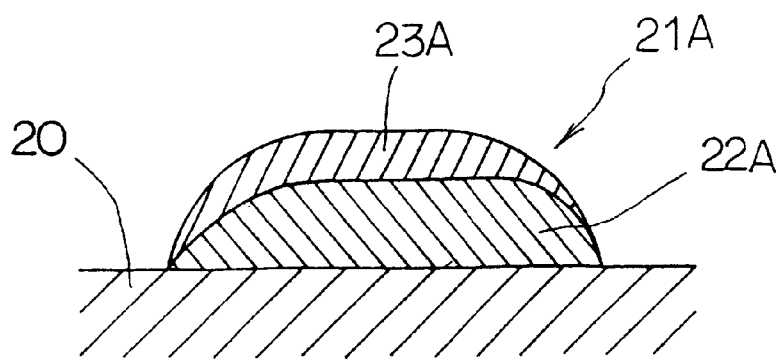
FIG. 9 is a cross sectional view of a sealing portion of a second structure.

(1) Like a sealing portion 21A shown in FIG. 9, sealing layers 22A and 23A may be printed in such a manner that the second sealing layer 23A covers the entire outer surface of the first sealing layer 22A. In this case, the bonding area of the second sealing layer 23A with respect to the first sealing layer 22A is made as large as possible to thereby sharply improve the bonding strength. Further, the width of the sealing portion 21A may be made as small as possible while improving the sealing property of the first sealing layer 22A by making the with thereof as large as possible so that the sealing portion 21A can be formed with ease even in a narrow width region.

Figure 10:
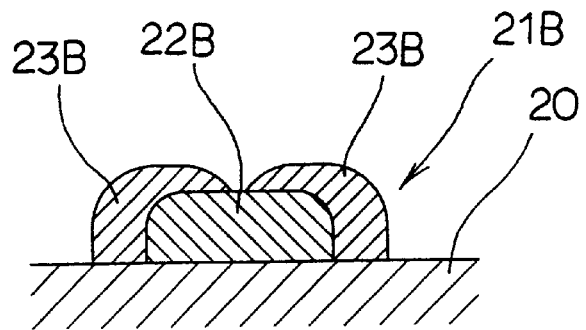
FIG. 10 is a cross sectional view of a sealing portion of a thirds structure.

(2) Like a sealing portion 21B shown in FIG. 10, a pair of second sealing layers 23B may be formed along the first sealing layer 22B so as to cover both side edges of the first sealing layer 22B. In this case, a second sealing layer 23B made of an optimum material suitable for a fluid contacting it may be formed on both sides of the first sealing layer 22B so that the durability and the sealing performance of the second sealing layer 23B may be enhanced.

Figure 11:
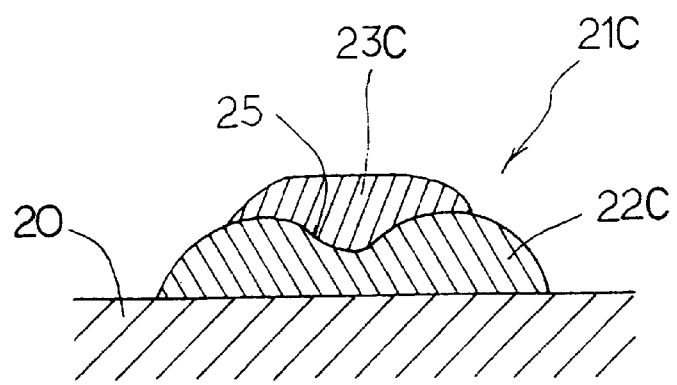
FIG. 11 is a cross sectional view of a sealing portion of a fourth structure.

(3) Like a sealing portion 21C shown in FIG. 11, a groove 25 extending throughout substantially the entire length of the sealing portion 21C may be formed at a position midway in the direction of the width of a first sealing layer 22C and a second sealing layer 23C may be so formed as to fill up the groove 25. In this case, a portion of the second sealing layer 23C filled into the groove 25 engages the groove 25 so that the fixing strength of the second sealing layer 23C with respect to the first sealing layer 22C can be sharply improved. Such groove 25 may be formed in such a manner that where, for example, the first sealing layer 22C is printed by screen printing, a portion of the screen corresponding to the groove 25 is masked to thereby reduce the amount of filling of the printing material or may be formed in such a manner that the first sealing layer 22B like shown in FIG. 10 is first formed and then the groove 25 is formed by after processing by means of cutting or a laser. Further, The groove 25 may have various sectional configurations such as V, square and etc.

Figure 12:
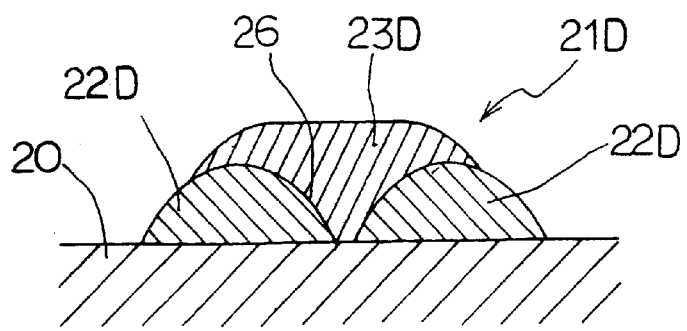
FIG. 12 is a cross sectional view of a sealing portion of a fifth structure.

(4) Like a sealing portion 21D shown in FIG. 12, a pair of first sealing layers 22D are arranged parallel to each other leaving a small gap therebetween and a second sealing layer 23D may be filled into a groove 26 formed between the first sealing layers 22D.

(5) Like a sealing portion 21E shown in FIG. 13, a plurality of grooves 27 extending along a first sealing layer 22E may be formed midway of the layer in the direction of the width thereof. Although the number of the grooves is three (3) in the shown example, there is no limitation to the number.

Then, as shown in FIG. 13(a), the second sealing layers 23E are formed in these grooves 27 so as to seal the mating surfaces by these three sealing lines or as shown in FIG. 13(b), the second sealing layer 23E may be formed only in the central groove 27 so that when the sealing portion 21E is closely adhered to the mating surface, the interior of each of the grooves 27 on both sides of the central groove 27 comes to have a negative pressure to allow the sealing portion 21E to be adsorbed to the mating surface, to thereby improve the sealing property.

Further, the second sealing layers 22E to be formed in the plurality of grooves 27 may be so formed as to have different heights. For example, as shown in FIG. 14, the heights of the second sealing layers 22E are made to become gradually lower from one side toward the other so that at a position where the surface pressure becomes high, the three second sealing layers 22E are held in pressure contact with the mating surface, at a position where the surface pressure is of a medium level, the two sealing layers 22E are held in pressure contact with the mating surface, and at a position where the surface pressure is of a low level, the third second sealing layer 22E is held in pressure contact with the mating surface thereby equalizing the surface pressure acting on the second sealing layers 22E.

Further, where a plurality of second sealing layers 22E are formed, the composition of them may be changed for each groove 27.

(6) Like the sealing structure shown in FIG. 15, a sealing groove 28 may be formed in the valve body parts 2 and 3 and a sealing portion 21 may be formed to fit in the groove. In this case, since the sealing portion 21 does not deform beyond the depth of the sealing groove 28, it is possible to securely prevent the sealing portion 21 from becoming abnormally deformed. The sealing groove 28 may be replaced with a sealing groove 29 as shown in FIG. 16 and also sealing portions 21A–21E may be formed in place of the sealing portion 21.

In the foregoing embodiments, a double layer structure comprising the first sealing layer 22 and the second sealing layer 23 and another double layer structure comprising the first sealing layers 22A–22E and the second sealing layers 23A–23E are used as the sealing portion 21 and the sealing portions 21A–21E , respectively, but it is also possible to use a multi-layer structure including more than three layers and in that case, it is preferable to determine the kind of material for each of the layers in such a manner that the closer the sealing layers to the separating plates 6–8, the harder the materials for the sealing layers.

Next, cases where the above-mentioned sealing structures are applied to the cylinder head gasket of an engine (hereinafter referred to as the "gasket") will be described.

Figure 17:
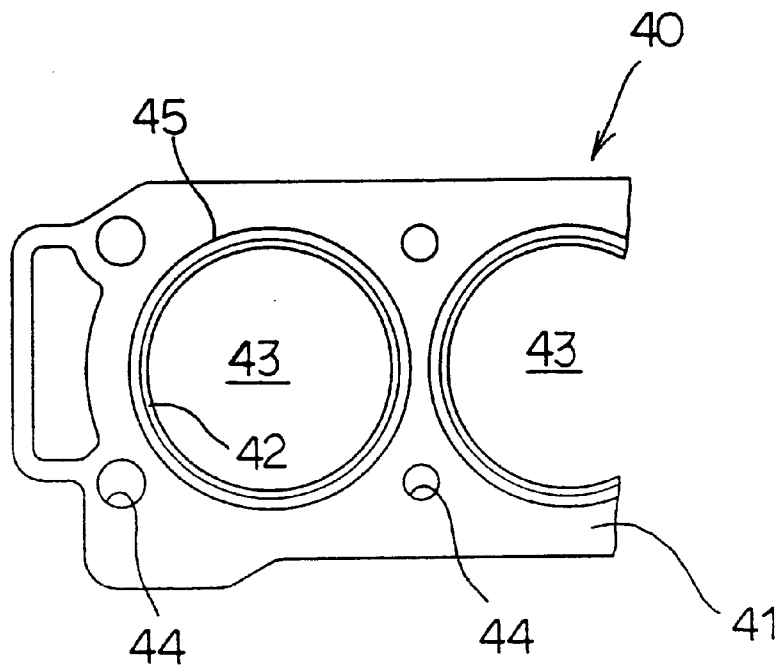
FIG. 17 is a plan view of a gasket.
Figure 18:
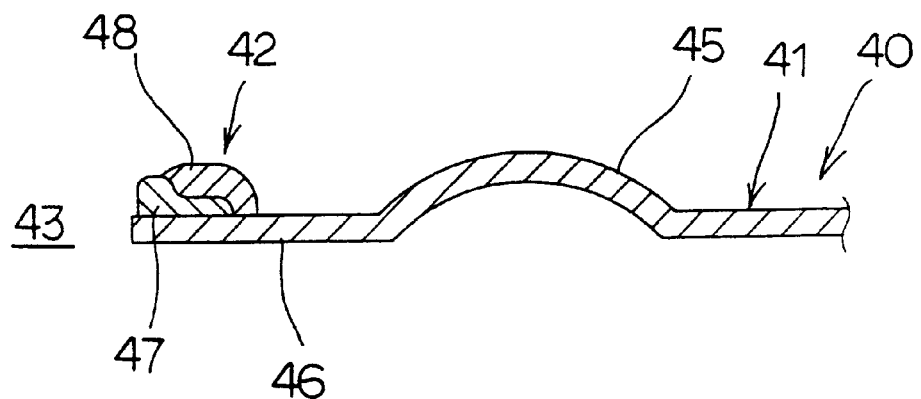
FIG. 18 is a vertical sectional view of a portion of a gasket near a sealing portion.

The gasket 40 shown in FIGS. 17 and 18 has a single plate structure comprising a sheet of bead plate 41 made of an elastic metallic plate. At positions on the bead plate 41 corresponding to cylinder holes, there are formed openings 43, respectively, and at positions corresponding to cylinder head bolts, there are provided holes 44, respectively. At a portion near the periphery of each of the openings 43 of the bead plate 41 there is formed an upwardly projecting annular bead 45 so as to surround the cylinder hole and between the periphery of the opening 43 and the bead 45 there is formed an annular flat portion 46 on the upper surface of which there is formed a sealing portion 42 for regulating abnormal displacement of the bead 45 and improving the sealing property thereof.

The sealing portion 42 comprises a first sealing layer 47 directly printed on the bead plate 41 and a second sealing layer 48 formed in such a manner that at least a part of the first sealing layer 47 is caused to overlap the first sealing layer 47 along the latter by printing.

The sealing layers 47 and 48 are made of the same materials as the above-mentioned sealing layers 22 and 23. That is, the first sealing layer 47 is made of a heat resistant and compression resistant material and the second sealing layer 48 is made of a heat resistant material which is softer than the material of which the first sealing layer 47 is made.

Figure 19:
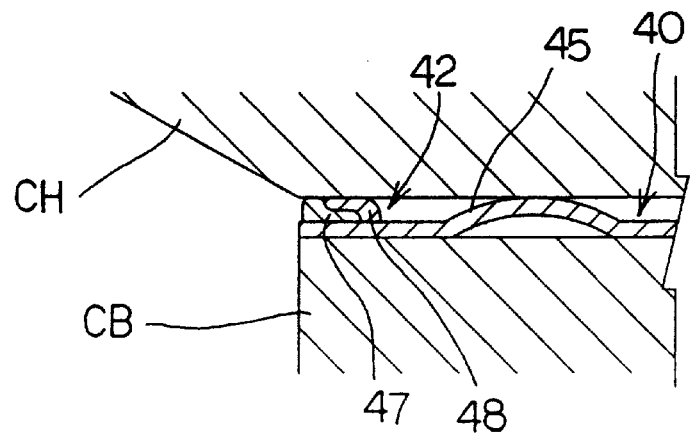
FIG. 19 is a vertical sectional view of a portion of the gasket near the sealing portion especially when the gasket is fabricated into an engine.

In the case of such gasket 40, the sealing performance is enhanced in such a manner that as shown in FIG. 19, the gasket 40 is held clamped between a cylinder head CH and a cylinder block CB and in this state, the second sealing layer 48 is closely adhered to the cylinder head CH together with the bead 45. Further, the crushing of the bead 45 due to an abnormal displacement thereof is prevented because the first sealing layer 47 serves as a stopper for forming a gap around the bead 45.

Figure 20:
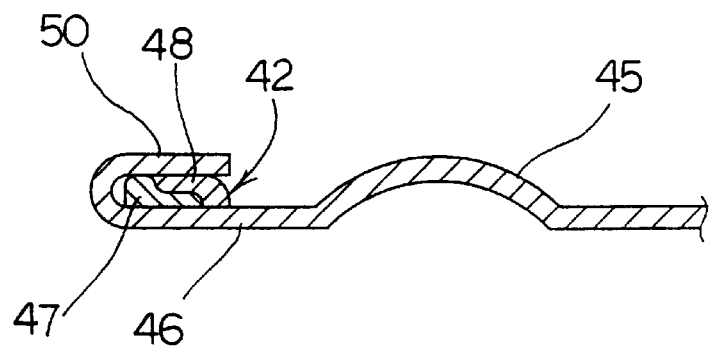
FIG. 20 is a vertical sectional view of an eleventh structure.

Incidentally, as shown in FIG. 20, the flat portion 46 may have a folded portion 50 so that the sealing portion 42 is held clamped by this folded portion. In this case, the sealing portion 42 may be formed on at least one of the upper and lower surfaces of the bead plate 41 at a position corresponding to the folded portion 50.

Figure 21:
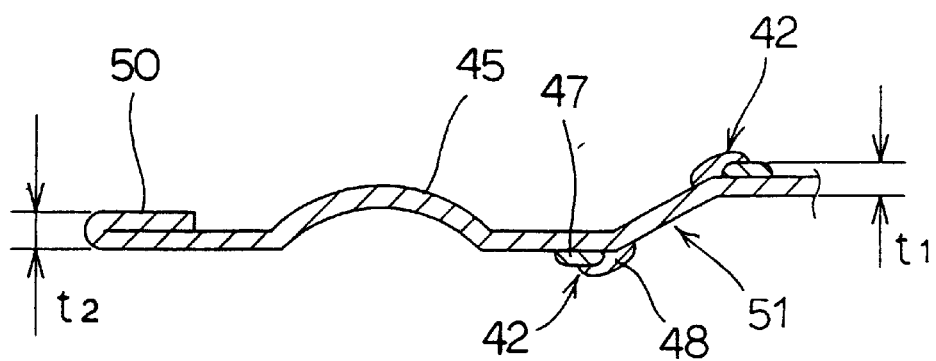
FIG. 21 is a vertical sectional view of a sealing portion of a twelfth structure.

Further, the sealing portion 42 may be formed at a portion of the base plate 41 other than the periphery of each of the openings 43 where the sealing performance is required. For example, it may be formed at a bent portion of a stepped bead 51 as shown in FIG. 21, In this case, the larger the difference between the thickness t2 of a portion corresponding to the folded portion 50 and the thickness t1 of a portion corresponding to the first sealing layer 47, the larger the compressibility of the stepped bead 51 to increase the surface pressure, provided that t2 >t1.

As shown in FIG. 22, the hard first sealing layer 47 is first printed on a portion of the bead plate 41 whose thickness is desired to be delicately adjusted and then the second sealing layer 48 may be coated on the entire surface of the bead plate 41. With this structure, it is possible to locally adjust the thickness of the gasket 40 without changing the thickness of the bead plate 41 itself. Further, it is possible that the material of the hard sealing layer be mixed with an anti-abrasive agent such as molybdenum disulfide to thereby improve the durability of the layer.

Furthermore, the sealing portion 42 may have the same sectional configuration as the above-mentioned sealing portions 21A–21E.

In the instant embodiment, a description was made of the gasket 40 of a single plate structure comprising the A bead plate 41 but the present invention is applicable also to a gasket 40 of a laminated composite plate structure comprising a bead plate 41 and an auxiliary plate. Further, in the case of such composite plate structure gasket 40, the sealing portion 42 may be formed on the side of the auxiliary plate.

Figure 23:
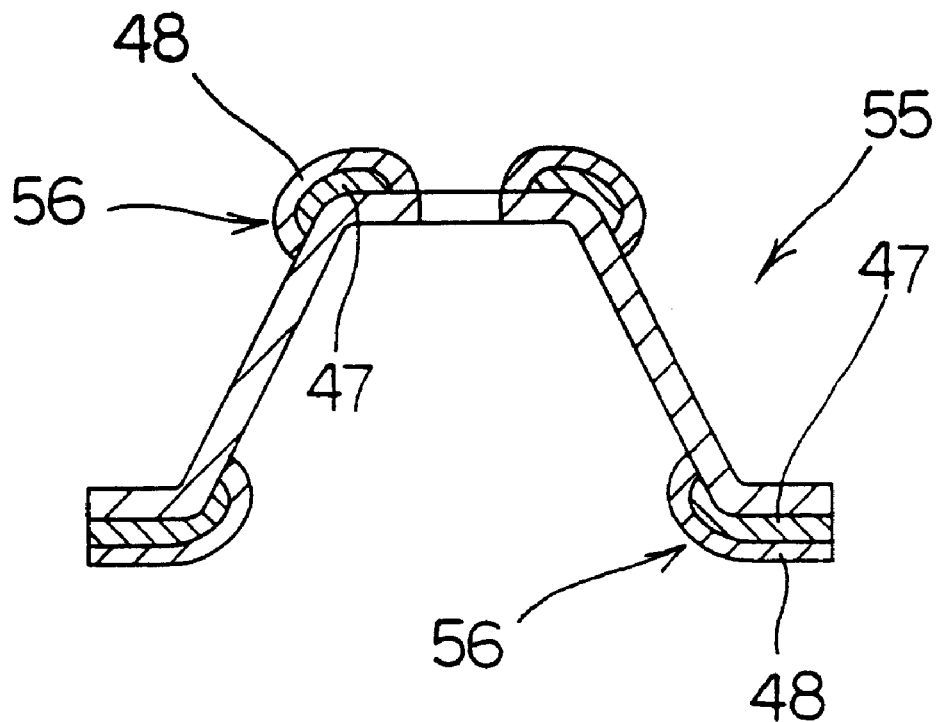
FIG. 23 is an illustration of a sealing structure when it is applied to a washer.
Figure 24:
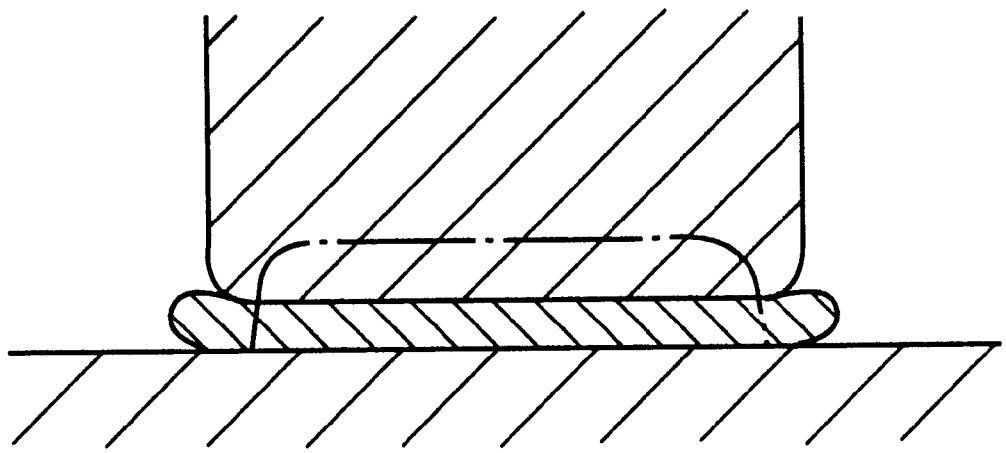
FIG. 24 is a cross sectional view of an essential portion of a convention sealing structure.

Further, in the instant embodiment, the present invention is applied to the control valve unit 1 and the engine cylinder head gasket 40 but the invention can also be applied even to the washer for use in supporting the compressor's gasket or fuel injection nozzle with respect to the cylinder head. For example, in the case of the washer for supporting the fuel injection nozzle with respect to the cylinder head, a sealing portion 56 having the same sectional configuration as the sealing portions 21, 21A–21E is to be formed on the entire periphery of the upper and lower portions of the cone-shaped washer 55 as shown in FIG. 23.

Advantages of the Invention

According to the first aspect of the invention, two members can be sealed without separately providing a gasket or the like so that the fabricability of the two members is improved and the manufacturing cost of the sealing structure is sharply reduced. Further, a sealing portion can be formed easily even on a part of the mating surface of a small width by reducing the entire width of the sealing portion while securing the sealing performance to a sufficient degree. In addition, both of the sealing layers are formed by printing, it is possible to form a sealing portion of a complicated pattern with ease. Further, since the first sealing layer functions as a stopper for securing a distance between the mating surfaces of both members, it is possible to prevent abnormal deformation of the second sealing layer by the first sealing layer. In addition, since the sealing portion is formed by laying the first and second sealing layers one above the other, the bonding strength of the sealing layers with respect to the mating surfaces can be improved by setting the bonding area of the layers to a large value while reducing the width of the sealing portion, when compared to a case where the first and second sealing layers are formed separately from each other.

According to the second aspect of the invention, the coming off of the second sealing layer can be more effectively prevented by increasing as much as possible the bonding strength of the second sealing layer with respect to the first sealing layer. Further, the entire width of the sealing portion can be made as small as possible while securing the width of the second sealing layer which can contribute much to the sealing performance.

According to the third aspect of the invention, a portion of the second sealing layer formed to fill up the grooves of the first sealing layer is held in engagement with the grooves so that the fixing strength of the second sealing layer with respect to the load in the horizontal direction is sharply improved. By the formation of such groove, at least two sealing lines are formed on top of the first sealing layer to thereby improve the sealing performance.

According to the fourth aspect of the invention, like the third aspect thereof, a portion of the second sealing layer to fill up the grooves of the first sealing layer is held in engagement with the grooves, the fixing strength of the second sealing layer with respect to the load in the horizontal direction is increased and a plurality of sealing layers are formed to improve the sealing performance. Further, by providing a second sealing layer of different hardness for each of the grooves or by changing the height of the second sealing layer for filling up each of the grooves, the surface pressure acing on the second sealing layer is made uniform to thereby improve the sealing performance.

According to the fifth aspect of the invention, by changing the width and height of the first or second sealing layer, the surface pressure acting on the second sealing layer can be made uniform over the entire length thereof to thereby improve the sealing performance.

According to the seventh aspect of the invention, the maximum amount of deformation of the sealing portion is determined by the depth or width of the sealing groove so that abnormal deformation of the sealing portion can be securely prevented.

According to the eighth aspect of the invention, by reducing the number of parts of the control valve unit, the manufacturing cost of the valve can be reduced and the fabricability of the valve can be improved and at the same time, it is possible to meet any design change and the like with ease.

What is claimed is:

1. A sealing structure for sealing adjacent members in a liquid-tight or air-tight fashion, the sealing structure, comprising:

a first sealing layer formed by printing on at least one of mating surfaces of the adjacent members; and a second sealing layer formed along said first sealing layer by printing with at least a part of said second sealing layer overlapping said first sealing layer, wherein said second sealing layer is made of a material softer than a material of which said first sealing layer is made, and wherein the printing height of said second sealing layer is made larger than that of said first sealing layer, wherein a groove is formed on said first sealing layer at an intermediate portion of the width of said first sealing layer, and said second sealing layer is formed to fill up said groove.

2. The sealing structure according to claim 1, wherein said second sealing layer is so formed as to cover the entire outer surface of said first sealing layer.

3. The sealing structure according to claim 1 or 2, wherein a plurality of grooves are formed at an intermediate portion of the width of said first sealing layer and said second sealing layer is formed to fill up at least one of said plurality of grooves.

4. The sealing structure according to claim 1 or 2, wherein the hardness of said first sealing layer is set to a value of 100 or more and the hardness of said second sealing layer is set to a value less than 100 with respect to the type A durometer hardness stipulated in JIS (Japanese Industrial Standards) K6253-1993.

5. The sealing structure according to claim 1 or 2, wherein said sealing layers are formed on one of the mating surfaces, and wherein a sealing groove capable of closely fitting on the sealing layers is formed on the other mating surface at a position opposite to said sealing layers.

6. The sealing structure according to claim 1 or 2, wherein one of the adjacent members is a separating plate of a control valve unit of an automatic gear unit and the other member is a valve body which is separated oil-tight by the separating plate.

* * * * *